United States Patent

[11] 3,581,685

| [72] | Inventor | Billy R. Taylor<br>210 Willowood, Levelland, Tex. 79336 |
|---|---|---|
| [21] | Appl. No. | 717,685 |
| [22] | Filed | Apr. 1, 1968 |
| [45] | Patented | June 1, 1971 |

[54] DEVICE FOR DISTRIBUTING CHEMICALS BENEATH THE SOIL SURFACE AND CONDITIONING SEED BEDS
3 Claims, 6 Drawing Figs.

[52] U.S. Cl............................................. 111/7,
172/700, 172/722
[51] Int. Cl........................................A01c 23/02,
A01b 13/08
[50] Field of Search......................... 111/1, 6, 7;
172/699—700, 720-33

[56] References Cited
UNITED STATES PATENTS

| 22,860 | 2/1859 | Essington | 172/722 |
|---|---|---|---|
| 302,436 | 7/1884 | Seymour | 172/722 |
| 1,074,217 | 9/1913 | Shafer | 172/720X |
| 3,038,424 | 6/1962 | Johnson | 111/7 |
| 1,287,930 | 12/1918 | Evans | 111/7 |
| 1,962,116 | 6/1934 | Atwater | 111/7 |
| 2,134,245 | 10/1938 | Carswell | 111/7UX |

FOREIGN PATENTS

| 530,673 | 9/1956 | Canada | 111/7 |
|---|---|---|---|
| 843,895 | 7/1939 | France | 111/7 |
| 335,464 | 9/1921 | Germany | 111/7 |

*Primary Examiner*—Robert E. Bagwill

ABSTRACT: This invention relates to a device which distributes a layer of chemicals within the soil, with minimum disturbance of the soil surface.

3,581,685
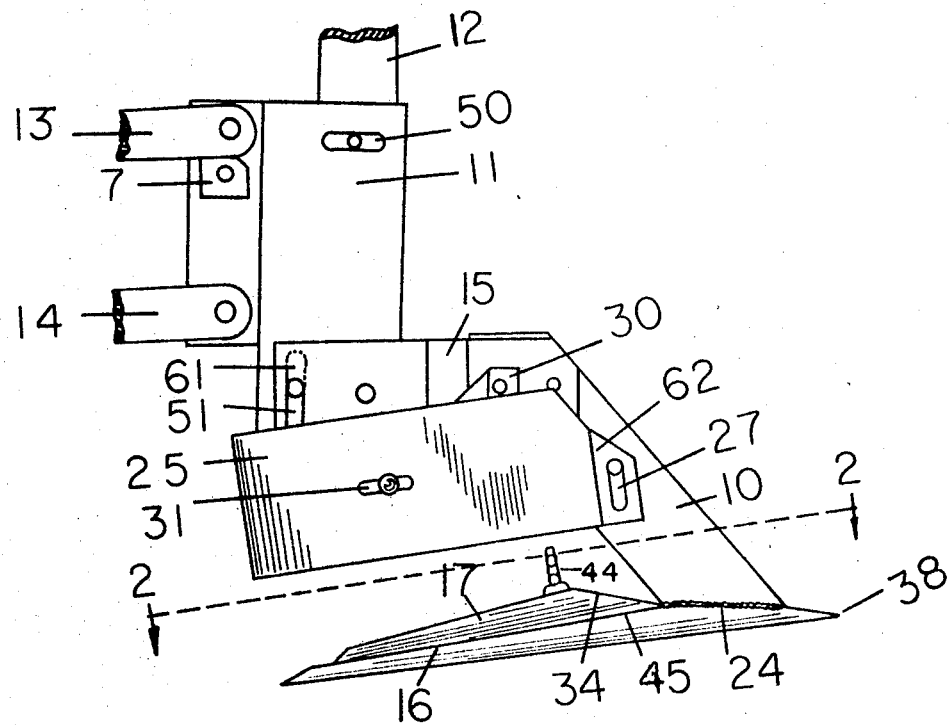
FIG.—1
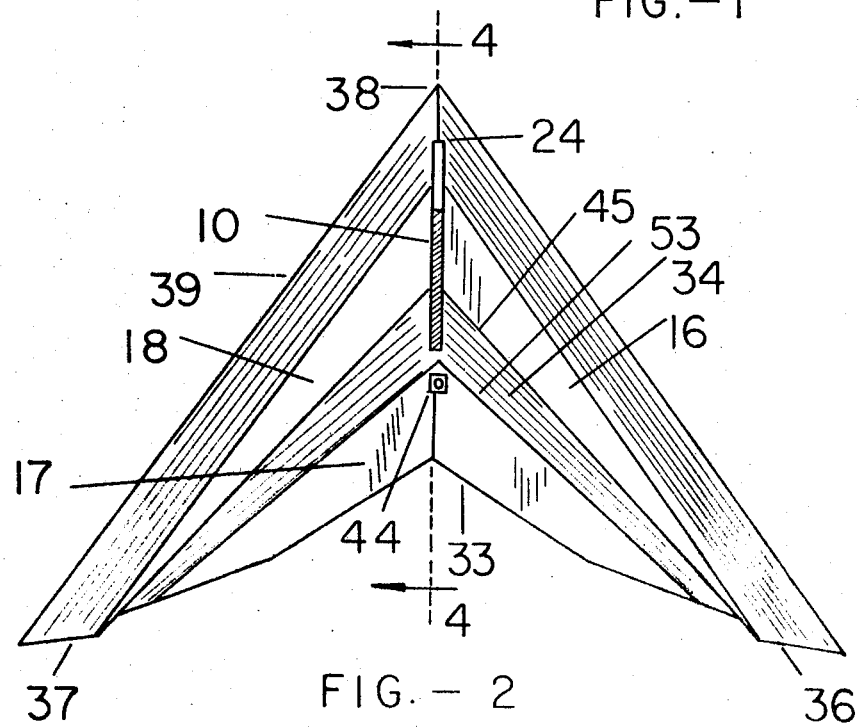
FIG.—2
Billy R. Taylor
INVENTOR

DEVICE FOR DISTRIBUTING CHEMICALS BENEATH THE SOIL SURFACE AND CONDITIONING SEED BEDS

This invention relates to earth working devices for seed bed preparation and depositing chemicals beneath the soil surface. Such chemicals include, but are not limited to herbicides, fungicides, nematocides, fertilizers, or other chemicals requiring soil incorporation or entrapment. Such incorporation is generally for the purpose of saving the chemical from deterioration or loss, and to provide proper lateral and vertical placement in relation to pest and crops for the chemical to perform its prescribed function.

Problems have previously existed in the uniform distribution and placement of chemicals in the soil. Shallow incorporation of herbicides has been obtained with expensive equipment such as power driven rotary hoes, and other complicated devices (see Pat. No. 3,295,480). Some of these operations leave some of the chemical exposed to loss, require separate operations, and leave the soil in a powdered condition subject to wind erosion. Most all attempts to trap chemicals under a shallow layer of soil have involved complicated power driven equipment and under some conditions damaged the seed bed.

Incorporation of herbicides, with operations separate from the planter and at shallow depth, have generally dried the seed bed; resulting in the need for additional moisture before planting, or removal of the treated soil in an effort to plant the crop seed in moist soil.

In the common example of herbicide incorporation with a tandem disc prior to bedding land, a crop subsequently planted on this bed has considerable root exposure to the herbicide due to the excessive depth of incorporation.

One attempt at subsurface application of chemicals was developed in the Stoneville Blade at the Delta Branch of the Agricultural Experiment Station in Mississippi. This horizontal straight edged blade fouled badly with trash and soil. Various types of vertically extending probes have been used to inject liquids into the soil, with the general result of uneven lateral distribution, and trash problems.

A plate has previously been welded over a high lift sweep for subsurface application of chemicals. This type of device can only be operated deep and with supporting soil to the sides of the sweep to maintain a flow of dirt over the shield area.

Seed bed shaping devices used in planting on the bed have generally pulverized the soil with a dragging or smoothing operation to dispose of excess dry dirt. This action has left sandy soil extremely susceptible to wind erosion with bed planting operations.

This invention provides an improved and simplified device for conditioning seed beds and the even distribution of chemicals beneath the earth's surface. A further object of the invention is to allow entrapment of chemicals with some control over entrapment depth. Such precision placement of some chemicals, such as herbicides, can reduce dosage required; as compared to other incorporation methods.

This invention has particular value as, but not limited to, an attachment for planters. The object in this specific use is to provide a device for removing excess dry dirt and incorporating herbicide for weed control, while conditioning the seed bed during the planting operation. This use of the invention provides a controlled depth of herbicide application so that herbicide is concentrated in the area of small weed seed germination and above the area of larger crop seed germination. This depth on many weed seeds is no more than 1 inch. This provides weed control with less herbicide and minimizes possible affects of the chemical on the crop. The use of less herbicide and the band application in the crop row reduces residue problems for future crops susceptible to the herbicide.

Another object of this invention is to provide a controlled flow of dirt over the sweep blades and shield area while operating on top of the bed and at shallow operation depths.

It is also the object of the invention to provide a bed shaping and conditioning device for use in planting on the bed without the shield area and nozzle system.

The unusual coaction of the pats of the device when mounted on a planter removing dry dirt to reach moist soil, while allowing a desired flow of proper textured covering soil on to the seed bed provides a badly needed device for bed planting operations on sandy textured soils.

Broadly described, the invention comprises a horizontal sweep to cut loose a layer of soil. A vertical, supporting shank is attached to said sweep.

As the leading edge of the sweep loosens soil, at a desired operating depth, dirt mover wings, adjustably suspended and diverging to the rear, remove a portion of the excess dry dirt and levels beds while allowing a desired portion to pass over the shield area and trap chemicals applied by the nozzle system under the said shield area.

The shield area is so recessed from the rear as to allow passage of soil while operating on top of the bed and at shallow depths. The nozzle system, enclosed by said shield area further provides relatively uniform chemical distribution in connection with the spray impact line caused by the flow of dirt over the shield area.

The invention will be better understood from the following detail description of certain specific, preferred embodiments taken in connection with the accompanying drawing, wherein:

FIG. 1 is a detail side elevation view of the device;

FIg. 2 is detail plan view of the lower section of the device taken on the line 2–2 of FIG. 1;

Figure 3:
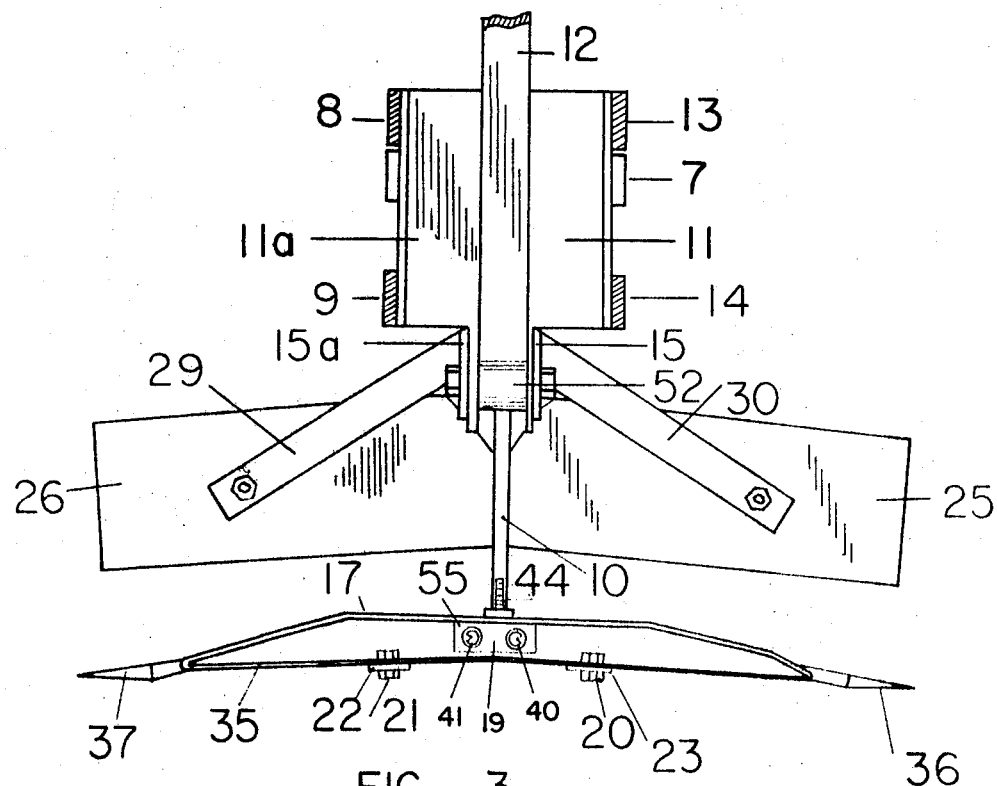
FIG. 3 is a rear elevation of the device as shown in FIG. 1 with the sweep set on a more level pitch.

Refer to FIGS. 1 thru 6 in detail, to illustrate specific application of this invention. In FIGS. 1 and 3, brackets 11 and 11a are attached to each side of the conventional planter beam 12. Slot 50 in brackets 11 and 11a provides pitch adjustment for seed furrow opening devices or tools carried to the rear of the invention by the parallel linkage 8, 9, 13 and 14. An adjustable linkage stop 7 is provided as an attachment to bracket 11 for linkage 13. The herbicide plow and bed conditioner are then provided independent pitch adjustment and some elevation adjustment by slot 51 in bracket 15 and 15a. A slot 61 is also provided in bracket 11 and 11a at this point to provide a matching exit for the bolt holding the pitch adjustment. A spacer 52 is provided between brackets 11 and 11a for a friction hold of bracket 15 and 15a, which are reduced to the thickness of shank 10 by two bends and secured to shank 10.

The thin shank 10, of cold roll material for additional strength, is welded to the sweep blades 16 and 18 along the median line 24. This weld is made with low heat rod to prevent crystallization and breakage of the sweep blade steel. The sweep blades 16 and 18 are sheared from intermediate knife steel to further reduce breakage problems created by welding high carbon knife steel. The front of the shank 10 forms an angle with the horizontal plane of the sweep blades of approximately 50°. This upward and rearward slope reduces trash accumulation. The thin shank 10 also provides a minimum of restriction of dirt flow over the sweep blades 16 and 18. This position of shank 10 also provides excellent location of attachment to slot 27 in dirt mover wings 25 and 26.

The dirt mover wings 25 and 26 are adjustably mounted to shank 10 by slot 27. The wings 25 and 26 are then bent out at line 62 so as to diverge to the side and rear as they terminate in the area of sweep blade tips 36 and 37, leaving enough rearward slope on the dirt mover wings to maintain dirt flow to the side.

The sweep blades 16 and 18 are joined at the sweep point 38 to form an angle of between 70° and 80°. This provides enough slope for trash flow while maintaining adequate width at the rear of the sweep. Wider angles function satisfactory without trashy conditions. The sweep blades 16 and 18 are tapered in width to the rear to allow more area for the spray pattern, and flexibility to the tips. The leading edge 39 is also beveled. Approximately 20 inches from blade tip 36 to blade tip 37 gives good coverage across a seed bed. The sweep blade tips 36 and 37 should drop approximately 2 inches below a horizontal line created by the welded joint at median line 24.

Although the nozzle shield area 17 of the sweep could be formed as a permanent portion of said sweep, and it is intended that the invention cover this adaptation; specific application herein described provides that it be detachable as is further described in the mode of operation.

The shield area 17 is constructed as right and left halves and then joined by welding along the median line. This enables each half to be bent at the leading edge 45 to form the lower shield areas 35 and the upper raised shield area 34, leaving sufficient room for the nozzle system 19 between the two surfaces. A second bend, along line 53, levels the upper shield area, and when the two halves are joined bend 53 serves as a backstop to prevent accidental rotation of the nozzle system 19. A hole is provided in the upper shield to so position the nozzle system 19, nozzles system bend 53, and is held in position by hose barb 44. A plastic line is then inserted between brackets 15 and 15a to the rear of shank 10 for connection with hose barb 44.

Figure 6:
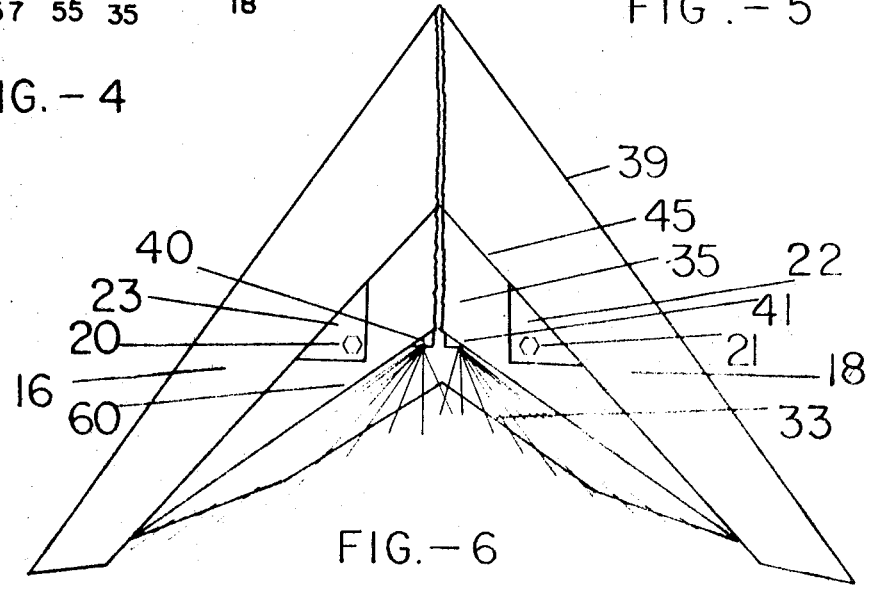
FIG. 6 is a detail bottom plan of FIG. 2.

Referring to FIG. 6, the nozzle system is constructed of material resistant to corrosion; brass and nylon being used in this application. A hole 54 is drilled and threaded downward into the brass body 55, to accommodate the nylon hose barb 44. Two additional holes are drilled and threaded in the rear side of the body to accommodate nipples holding spray tips 40 and 41. Spray tips 40 and 41 each contain an off center fluid dispersal orifice. Smaller holes are drilled 56 and 57 to connect the hose barb 44 with the nipples holding spray tips 40 and 41.

A rubber washer seal 42, provided for each tip 40 and 41, has sufficient compression distance so as to maintain a water seal from the beginning to the end of a complete revolution of the nipple and nozzle tip 41. This procedure enables exact positioning of the flat spray pattern emitting from the side and center of the nozzle tips 40 and 41. A line screen is used, as a conventional part of the spray system, to service the nozzle system on all rows of the planter.

All materials of construction are those conventionally used in parts of the nature shown except as specifically stated to the contrary.

Further detailed description is understood as the mode of operation is explained referring to FIGS. 1 thru 6.

The operation of the device in the preferred mode of operation, with a planter, is illustrated by FIG. 1. Various types of brackets can be provided for attaching the shank 10 adjustably to another shank or planter beam 12, further attached to the planter tool bar. Planter beams 12 and tool bar shanks are conventional and take various forms. The operating depth of the planter tool bar, and thus the invention, is controlled by gauge wheels or skids as a conventional part of the planter or chemical applicator. The planter is powered by a tractor or other self-propelled vehicle.

With the device so arranged its movement with the power means precedes seed furrow opening devices in preparing the bed as a part of the planting operation. When the device is used only as a seed bed conditioner and the bed shaper, the shield 17 and nozzle system 19 can be removed by bolts at 20 and 21. Attachments 22 and 23 are welded to the rear edge of the sweep blades 16 and 18 for this purpose. The relatively low lift of the sweep blades 16 and 18 cuts under the desired amount of soil. The proper depth of operation on a bed planter is normally just at the beginning of moist soil. This provides a covering of the seed furrow or bed with a layer of dry small clods reducing wind erosion and drying in the seed furrow.

As the soil is set in motion by the sweep blades 16 and 18, dirt mover wings 25 and 26 remove excess dry dirt to the sides of the seed furrow area while controlling the amount of trapping and covering soil that passes over the sweep blades 16 and 18 and shield 17. Height of the dirt mover wings 25 and 26 above the sweep blades 16 and 18 can be set from near the blades 16 and 18 to approximately 3½ inches above the blades by exchanging sides with the dirt mover wings 25 and 26, and by use of a vertical slot 27 in the dirt mover wings 25 and 26. Braces 29 and 30 are provided to dirt mover wings 25 and 26 for removal of heavier dirt loads. Slot 31 in the dirt mover wing 25 allows up and down adjustment of the rear portion of the dirt mover wings while connected to braces 29 and 30. In instances where moisture is near the surface and where excess dirt removal is not needed, dirt mover wings 25 and 26 can be removed from the device.

An alternative mode of operating the sweep blades 16 and 18 with dirt mover wings 25 and 26 includes suspension of the dirt mover wings above the level of sweep blade operation by attachments of dirt mover wings 25 and 26 to the lower end of a separate vertically extending shank, terminating at its upper end with the conventional shank supporting shank 12, or separate tool bar mounted in front of and parallel to the first.

The uniform placement and entrapment of chemicals is added as a part of the above described operations by bolting through the lower shield area 35, to attachments 22 and 23. Said shield 17 encloses a nozzle system providing reasonably uniform spray distribution across the close impact line formed by the upper rear edge 33 of the shield 17. The shield 17 raises the soil on the front slope of the raised area 34, and is further supported by shield 17 until being deposited back on the seed bed over the upper trailing edge 33. Underneath this operation, chemical is sprayed so as to be trapped by the soil flowing over the shield 17. A lower shield area 35 is provided to protect the nozzle system 19 and spray pattern from below. The rear edge 60 of the lower shield area 35 is recessed from the rear slightly more than the upper rear edge 33 to enable easier access to nozzle tips 40 and 41.

Referring to FIG. 2, the recessed upper trailing edge 33 of the shield 17 enables a sustained flow of dirt over the shield as the sweep operates at shallow depths or on top of beds where side supporting dirt is not present. The recessed trailing edge 33 is further described by the distance omitted on the shield 17 between an imaginary line drawn from sweep blade tips 36 and 37 to the trailing edge 33 of the shield 17. The resistance to dirt flow over the shield is increased proportionally as the distance from the sweep point 38 or sweep blade leading edge 39 to the shield trailing edge 33 is increased. The greater part of this restriction to dirt flow is caused by the distance between point 45 at the beginning of the slope over the raised area 34 and to the upper shield trailing edge 33. The distance eliminated in the specific application herein described approximates 30 percent of the distance between the sweep point 38 and an imaginary line between sweep blade rear tips 36 and 37, said imaginary line being approximately 20 inches long for sufficient coverage of a crop seed bed. The distance eliminated in the shield area from the beginning of the raised area at point 45 to said imaginary line approximates 50 percent. It is not intended that variations in these dimensions and percentages would constitute departure from the principles and scope of this invention, so long as they provide a flow of dirt over shield 17 on top of beds or at shallow operating depths.

The shape of the impact line created by trailing edge 33 of the shield area causes the nozzle system illustrated in FIGS. 5 and 6 to give improved uniformity of spray distribution over other available nozzle systems.

The two nozzle orifices in tips 40 and 41, mounted to each side of the median line, are positioned for proper spray pattern direction by the flexible rubber seal 42 providing a water seal as the threaded nipple holding tip 40 is screwed into the brass body 55. The off center fluid dispersal orifice in tip 40 and 41 is of conventional design, delivering progressively increased spray volume per degree of outside spray angle. The spray pattern is illustrated by lines emitting from tips 40 and 41 in FIG. 6. The use of two such orifices cover the unusual impact line and at closer range than other systems. Using 3 or more flat even spray orifices would provide reasonably uniform coverage, but would increase the gallons used per acre to unnecessary high levels, or decrease orifice size to increase stoppage problems. A suitable nozzle system could be provided by including two of the off center spray orifices in one twin orifice nozzle tip.

Figure 4:
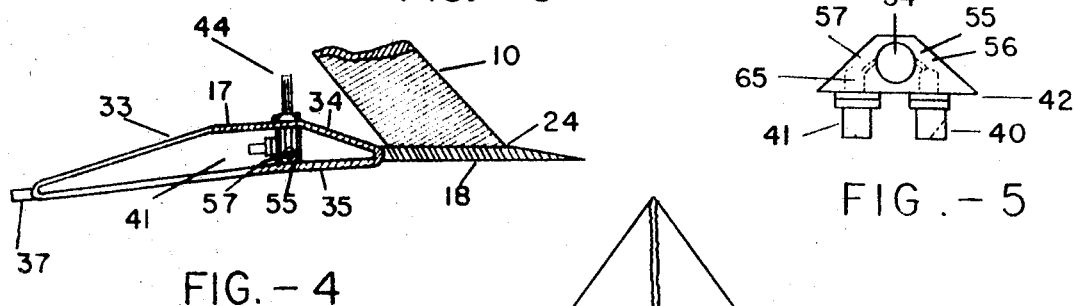
FIG. 4 is a detail side sectional view of FIG. 2 taken on the line 4–4.
Figure 5:
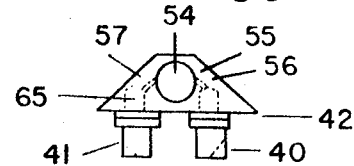
FIg. 5 is an enlarged plan view of the nozzle system.

A different mode of operation and use is made of the principles involved by using the right and left halves of the device as divided along the median line 24. Slight revisions are made, providing a shank 10 for each blade 18 and 16. The nozzle system 19 is revised to mount a hose barb 44 to the left and right of the median line to supply the separated nozzle tips 40 and 41. The opening in the nozzle shield 17 exposed along the median line as shown in FIG. 4, is closed in this adaptation.

The resulting two devices are then mounted to cultivating equipment in conventional manner, so as to be located on each side of the row of growing crop. In this position they function to apply herbicides and other chemicals beneath the soil surface to control weeds, other pest, and benefit the crop. The balance of this operation is as described in other parts of this application.

It is understood that it is intended to cover all changes and modifications of the examples of the invention herein chosen for purpose of illustration, which do not constitute departures from the spirit and scope of the invention.

I claim as my invention:

1. A chemical distributing device comprising a generally V-shaped, horizontally disposed blade, a tool shank attached thereto and centrally thereof, said shank sloping rearwardly and being of a thickness whereby minimum resistance is given when said blade is drawn through the soil, a shield member attached to said blade at the interior periphery thereof, and having generally V-shaped upper and lower walls, said upper wall being inclined upwardly and inwardly to a midpoint and then being horizontally flattened at the trailing portion thereof, said lower wall being generally coplanar with the rearward portion of said upper wall, and the trailing portion of said lower wall being recessed a predetermined distance so that the upper wall overhangs the same, a fluid distribution means disposed within said shield member and centrally thereof, and being adapted to spray fluid to the rear and between said upper and lower walls.

2. A device as set forth in claim 1, and wherein said fluid distribution means includes at least two nozzles having offset orifices adapted to spray greater amounts of fluid towards the sides rather than into the central area of said device.

3. A device as set forth in claim 1, ad further including rearwardly diverging dirt mover wings mounted on said shank above said blade and being adapted to control the amount of dirt passing over said blade and shield member when the same pass through the soil.